US011834307B2

(12) United States Patent
Suyama et al.

(10) Patent No.: US 11,834,307 B2
(45) Date of Patent: Dec. 5, 2023

(54) OVERHEAD LINE SYSTEM AND CONTROL METHOD

(71) Applicant: TOYOTA JIDOSHA KABUSHIKI KAISHA, Toyota (JP)

(72) Inventors: Kazuo Suyama, Tokyo (JP); Katsuji Harajiri, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 351 days.

(21) Appl. No.: 17/231,529

(22) Filed: Apr. 15, 2021

(65) Prior Publication Data

US 2022/0024713 A1 Jan. 27, 2022

(30) Foreign Application Priority Data

Jul. 27, 2020 (JP) .................................. 2020-126806

(51) Int. Cl.
*B66C 21/10* (2006.01)
*A01G 23/083* (2006.01)

(52) U.S. Cl.
CPC ............ *B66C 21/10* (2013.01); *A01G 23/083* (2013.01)

(58) Field of Classification Search
CPC ... B66C 13/50; B66C 23/90; B66C 21/00–10; B66D 1/58; A01G 23/003; A01G 23/083; B61B 7/00–06; B61D 15/125
See application file for complete search history.

(56) References Cited

U.S. PATENT DOCUMENTS

| 4,127,197 | A | * | 11/1978 | Dumont | B66C 21/00 212/122 |
| 4,515,281 | A | * | 5/1985 | Maki | B66C 21/00 212/122 |
| 4,687,109 | A | * | 8/1987 | Davis | B66C 21/00 212/331 |
| 5,097,972 | A | * | 3/1992 | Gladhart | B66C 21/00 212/122 |
| 5,392,935 | A | * | 2/1995 | Kazama | B66C 21/00 212/87 |
| 2012/0038485 | A1 | * | 2/2012 | Ouellet | B66C 21/00 700/275 |
| 2020/0305361 | A1 | | 10/2020 | Suyama et al. | |

FOREIGN PATENT DOCUMENTS

| JP | S47-030459 U | 12/1972 |
| JP | 2008-109918 A | 5/2008 |
| JP | 2019-011165 A | 1/2019 |
| JP | 2020-162456 A | 10/2020 |

* cited by examiner

*Primary Examiner* — Sang K Kim
*Assistant Examiner* — Nathaniel L Adams
(74) *Attorney, Agent, or Firm* — Oliff PLC (57) ABSTRACT

An overhead line system includes a plurality of support posts, an overhead line supported by the support posts, a lifting device with which the overhead line is liftable, a suspension device that is connected to the overhead line and is movable in the air as the lifting device winds the overhead line, and a control device. The control device controls the lifting device so as to reduce tension when a predetermined condition relating to a tension abnormality of the overhead line is satisfied.

2 Claims, 7 Drawing Sheets

OVERHEAD LINE SYSTEM AND CONTROL METHOD

CROSS-REFERENCE TO RELATED APPLICATION

This application claims priority to Japanese Patent Application No. 2020-126806 filed on Jul. 27, 2020, incorporated herein by reference in its entirety.

BACKGROUND

1. Technical Field

The disclosure relates to a technique for moving a predetermined device using an overhead line.

2. Description of Related Art

Japanese Unexamined Patent Application Publication No. 2008-109918 (JP 2008-109918 A) discloses a timber conveyance system for conveying timber from forest thinning from a logging position to an unloading position. The timber conveyance system above includes a tower yarder disposed in proximity to the unloading position on a work road, a first winch that is provided in the tower yarder and winds a first wire, a second winch that is provided in the tower yarder and winds a second wire, a plurality of pulleys that is connected in the middle of a traveling path of the second wire and converts a traveling direction of the second wire, and a plurality of zigzag pulleys that is connected in the middle of a traveling path of a loading tool and converts a traveling direction of the loading tool.

SUMMARY

According to the technique disclosed in JP 2008-109918 A, there is a possibility that tension of the wire increases when the timber from thinning in the process of conveyance is caught on a remaining tree, for example, and the system may be broken when the winch is continuously operated in this state.

An object of the disclosure is to provide a technique capable of protecting an overhead line system when an abnormality occurs.

In order to solve the issue above, an overhead line system according to an aspect of the disclosure includes: a plurality of support posts; an overhead line supported by the support posts; a lifting device with which the overhead line is liftable; a suspension device that is connected to the overhead line and is movable in the air as the lifting device winds the overhead line; and a control device that controls the lifting device so as to reduce tension when a predetermined condition relating to a tension abnormality of the overhead line is satisfied.

Another aspect of the disclosure is a control method. The method is a control method for an overhead line system including a lifting device with which an overhead line supported by a support post is liftable and a suspension device that is connected to the overhead line and is movable in the air as the lifting device winds the overhead line, and includes controlling the lifting device to reduce tension when a predetermined condition relating to a tension abnormality of the overhead line is satisfied.

According to the disclosure, the overhead line system can be protected when an abnormality occurs.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
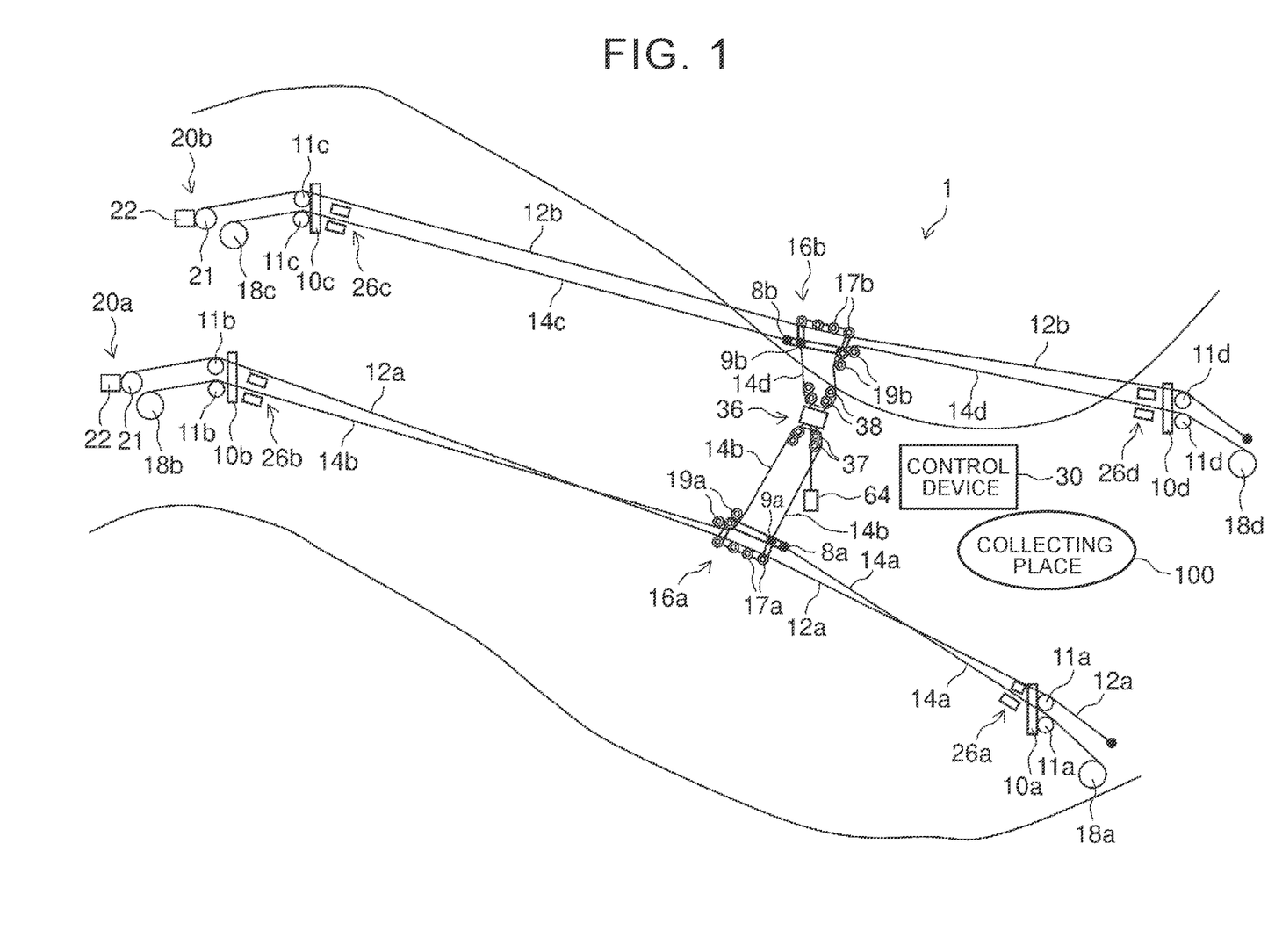
FIG. 1 is a diagram for explaining an overhead line system according to an embodiment.

FIG. 1 is a diagram for explaining an overhead line system 1 according to an embodiment. The overhead line system 1 includes a first support post 10a, a second support post 10b, a third support post 10c, a fourth support post 10d (when the support posts are not distinguished, each support post is referred to as a "support post 10"), a first main rope 12a, a second main rope 12b (when the main ropes are not distinguished, each main rope is referred to as a "main rope 12"), a first work rope 14a, a second work rope 14b, a third work rope 14c, a fourth work rope 14d (when the work ropes are not distinguished, each work rope is referred to as a "work rope 14"), a first moving device 16a, a second moving device 16b (when the moving devices are not distinguished, each moving device is referred to as a "moving device 16"), a first lifting device 18a, a second lifting device 18b, a third lifting device 18c, a fourth lifting device 18d (when the lifting devices are not distinguished, each lifting device is referred to as a "lifting device 18"), a first fixing device 20a, a second fixing device 20b (when the fixing devices are not distinguished, each fixing device is referred to as a "fixing device 20"), a first tension detecting unit 26a, a second tension detecting unit 26b, a third tension detecting unit 26c, a fourth tension detecting unit 26d (when the tension detecting units are not distinguished, each tension detecting unit is referred to as a "tension detecting unit 26"), a control device 30, a suspension device 36, and a logging device 64.

The overhead line system 1 is a so-called H-type overhead line system. The overhead line system 1 is used to lift timber logged in a forest using the main ropes 12 and the work ropes 14 stretched in the air and convey the timber to the vicinity of a collecting place 100. The overhead line system 1 is configured as a logging system. This allows timber to be conveyed from the forest without creating roads.

The four support posts 10 are erected at positions suitable for erection determined based on an arrangement of standing trees and a position of the collecting place 100. The first support post 10a and the third support post 10c are disposed diagonally from each other, and the second support post 10b and the fourth support post 10d are disposed diagonally from each other. The support posts 10 are each set to a size of, for example, about two meters to five meters, depending on the size of the overhead line system 1, etc.

The main ropes 12 and the work ropes 14 are hung on pulleys of the support posts 10 as overhead lines. One end of the first main rope 12a is fixed to the ground in proximity to the first support post 10a as a fixed end. The first main rope 12a is stretched from the fixed end on the ground to the first fixing device 20a disposed in proximity to the second support post 10b via a pulley 11a of the first support post 10a and a pulley 11b of the second support post 10b. The other end of the first main rope 12a is fixed by the first fixing device 20a.

One end of the second main rope 12b is fixed to the ground in proximity to the fourth support post 10d as a fixed end. The second main rope 12b is stretched from the fixed end to the second fixing device 20b disposed in proximity to the third support post 10c via a pulley 11d of the fourth support post 10d and a pulley 11c of the third support post 10c. The other end of the second main rope 12b is fixed by the second fixing device 20b.

The main rope 12 functions as a rail in the air. The first main rope 12a and the second main rope 12b are provided so as not to intersect with each other. A length of the main rope 12 is, for example, about 300 to 2000 meters.

The fixing device 20 includes a drum 21 for lifting (also referred to as reeling) or lowering (also referred to as feeding) of the main rope 12, and a fixing portion 22 that fixes the drum 21 such that the drum 21 does not rotate. A configuration of the fixing portion 22 is not particularly limited as long as the drum 21 can be fixed. For example, the fixing portion 22 may include a movable pin that is fittable to any of a plurality of recesses provided in the drum 21. When installing the first main rope 12a, an operator fixes the one end of the first main rope 12a to the ground and bridges the first main rope 12a between the pulley 11a of the first support post 10a and the pulley 11b of the second support post 10b. The other end of the first main rope 12a is fixed to the drum 21 of the first fixing device 20a. Subsequently, the operator causes the drum 21 of the first fixing device 20a to rotate using a drive source such as a motor (not shown), and the drum 21 reels the first main rope 12a. When tension of the first main rope 12a reaches a desired value, the drive source is stopped, and the fixing portion 22 fixes the drum 21 in accordance with an operation by the operator. With the processing above, the first main rope 12a is stretched between the first support post 10a and the second support post 10b. Similarly, the second main rope 12b is also stretched between the third support post 10c and the fourth support post 10d. The drive source may be detachable, and the detached drive source can also be used for installing the second main rope 12b. After the installation of the main rope 12 is completed, the drive source can also be used as a drive source for the lifting device 18 to be described later.

The fixing device 20 can release the fixing of the drum 21 by the fixing portion 22 in response to a wireless command signal from the control device 30. When the fixing is released, the drum 21 rotates due to the tension of the main rope 12, and the drum 21 can lower the main rope 12. During this processing, the fixing device 20 may brake the drum 21 such that a rotation speed of the drum 21 becomes a predetermined value or less. The fixing device 20 may have the same configuration as the lifting device 18.

A pair of the moving devices 16 is supported by a pair of the main ropes 12, and can move in the air along the main ropes 12. A plurality of first pulleys 17a provided for the first moving device 16a are hung on the first main rope 12a, and a plurality of first pulleys 17b provided for the second moving device 16b are hung on the second main rope 12b.

The work rope 14 functions as a running rope to be lifted by the lifting device 18, and is also called a lifting rope. The first work rope 14a, the second work rope 14b, the third work rope 14c, and the fourth work rope 14d correspond to a first overhead line, a second overhead line, a third overhead line, and a fourth overhead line, respectively. The first work rope 14a, the second work rope 14b, the third work rope 14c, and the fourth work rope 14d are each hung on a pulley provided for the corresponding support post 10, and each have one end connected to the moving device 16, and the other end connected to the lifting device 18.

The first work rope 14a and the second work rope 14b are connected to the first moving device 16a. One end of the first work rope 14a is fixed to the first moving device 16a as a fixed end 8a. The first work rope 14a is stretched from the fixed end 8a of the first moving device 16a and connected to the first lifting device 18a disposed in proximity to the first support post 10a via the pulley 11a of the first support post 10a.

One end of the second work rope 14b is fixed to the first moving device 16a as a fixed end 9a. The second work rope 14b is stretched from the fixed end 9a of the first moving device 16a and is connected to the second lifting device 18b disposed in proximity to the second support post 10b via a plurality of first pulleys 37 provided for the suspension device 36, a plurality of second pulleys 19a provided for the first moving device 16a, the pulley 11b of the second support post 10b.

The fixed end 8a and the fixed end 9a of the first moving device 16a are disposed on the first support post 10a side, and the second pulleys 19a of the first moving device 16a are disposed on the second support post 10b side.

The first lifting device 18a, the first support post 10a, the second support post 10b, and the second lifting device 18b are disposed substantially in a straight line in this order.

The third work rope 14c and the fourth work rope 14d are connected to the second moving device 16b. One end of the third work rope 14c is fixed to the second moving device 16b as a fixed end 8b. The third work rope 14c is stretched from the fixed end 8b of the second moving device 16b and connected to the third lifting device 18c disposed in proximity to the third support post 10c via the pulley 11c of the third support post 10c.

One end of the fourth work rope 14d is fixed to the second moving device 16b as a fixed end 9b. The fourth work rope 14d is stretched from the fixed end 9b of the second moving device 16b and is connected to the fourth lifting device 18d disposed in proximity to the fourth support post 10d via a plurality of second pulleys 38 provided for the suspension device 36, a plurality of second pulleys 19b provided for the second moving device 16b, and the pulley 11d of the fourth support post 10d.

The fixed end 8b and the fixed end 9b of the second moving device 16b are disposed on the third support post 10c side, and the second pulleys 19b of the second moving device 16b are disposed on the fourth support post 10d side.

The third lifting device 18c, the third support post 10c, the fourth support post 10d, and the fourth lifting device 18d are disposed substantially in a straight line in this order.

The weights of the moving device 16, the suspension device 36, and the logging device 64 are mainly supported by the main ropes 12, and a part of the weight thereof is supported by the work ropes 14.

The suspension device 36 is connected to the first moving device 16a via the second work rope 14b, and is connected to the second moving device 16b via the fourth work rope 14d. The suspension device 36 is located between the main ropes 12 and suspends the logging device 64. The logging device 64 moves in an area defined by the support posts 10 together with the suspension device 36, logs trees in the area, and grips and conveys the logged trees. A configuration example of the logging device 64 will be described later.

The suspension device 36 wirelessly receives a command signal from the control device 30 and moves the logging device 64 suspended by the suspension device 36 up and down using an elevating wire. The suspension device 36 includes an imaging unit (not shown) for monitoring a state of the logging device 64.

The lifting device 18 functions as a winch for lifting and lowering corresponding one of the work ropes 14 in response to a wireless command signal from the control device 30, and includes a drum for lifting or lowering corresponding one of the work ropes 14 and a drive source such as a motor (not shown).

The lifting device 18 is provided for each of the support posts 10. It can be said that the lifting device 18 is provided at each end point of the overhead line system 1. The distance between each of the support posts 10 and the corresponding lifting device 18 is set based on a drum width of the lifting device 18 so as to secure an appropriate fleet angle, and may be within a range of several meters to several tens of meters, for example.

The lifting devices 18 lifts and lowers the work ropes 14 to move the logging device 64 and the suspension device 36 in the air in a substantially horizontal direction.

The tension detecting unit 26 includes a tension sensor. The first tension detecting unit 26a is provided in proximity to the first support post 10a, and detects tension of the first main rope 12a and the first work rope 14a. The second tension detecting unit 26b is provided in proximity to the second support post 10b, and detects tension of the first main rope 12a and the second work rope 14b. The third tension detecting unit 26c is provided in proximity to the third support post 10c, and detects tension of the second main rope 12b and the third work rope 14c. The fourth tension detecting unit 26d is provided in proximity to the fourth support post 10d, and detects tension of the second main rope 12b and the fourth work rope 14d. The tension detecting unit 26 wirelessly transmits the detected tension data to the control device 30.

Operations of the overhead line system 1 will be described. The control device 30 moves the suspension device 36 to a designated position by executing coordination control on the lifting devices 18.

The first lifting device 18a and the second lifting device 18b lift one of the first work rope 14a and the second work rope 14b and lower the other to move the first moving device 16a along the first main rope 12a. The third lifting device 18c and the fourth lifting device 18d lift one of the third work rope 14c and the fourth work rope 14d and lower the other to move the second moving device 16b along the second main rope 12b. With the processing above, the suspension device 36 is displaced along the main ropes 12.

Specifically, the first lifting device 18a lifts the first work rope 14a and the second lifting device 18b lowers the second work rope 14b to move the first moving device 16a toward the first support post 10a. The fourth lifting device 18d lifts the fourth work rope 14d and the third lifting device 18c lowers the third work rope 14c to move the second moving device 16b toward the fourth support post 10d. With the processing above, the suspension device 36 moves in the direction approaching the collecting place 100 between the first support post 10a and the fourth support post 10d.

Further, the first lifting device 18a lowers the first work rope 14a and the second lifting device 18b lifts the second work rope 14b to move the first moving device 16a toward the second support post 10b. The fourth lifting device 18d lowers the fourth work rope 14d and the third lifting device 18c lifts the third work rope 14c to move the second moving device 16b toward the third support post 10c. With the processing above, the suspension device 36 moves in the direction away from the collecting place 100.

The first support post 10a and the third support post 10c are disposed diagonally from each other, the fixed end 8a of the first moving device 16a is located on the first support post 10a side, and the fixed end 8b of the second moving device 16b is located on the third support post 10c side. Therefore, the suspension device 36 can be smoothly moved in both of the direction approaching the collecting place 100 and the opposite direction from the approaching direction using the four work ropes 14.

The lifting device 18 lifts one of the second work rope 14b and the fourth work rope 14d and lowers the other to move the suspension device 36 between the first moving device 16a and the second moving device 16b. That is, the second work rope 14b and the fourth work rope 14d are also used for movement in the direction above.

Specifically, the first lifting device 18a fixes the first work rope 14a, the second lifting device 18b lifts the second work rope 14b, the third lifting device 18c fixes the third work rope 14c, and the fourth lifting device 18d lowers the fourth work rope 14d to move the suspension device 36 to the first moving device 16a side.

The third lifting device 18c fixes the third work rope 14c, the fourth lifting device 18d lifts the fourth work rope 14d, the first lifting device 18a fixes the first work rope 14a, and the second lifting device 18b lowers the second work rope 14b to move the suspension device 36 to the second moving device 16b side.

In this case, the first lifting device 18a and the third lifting device 18c can also move the suspension device 36 diagonally with respect to a direction in which the main ropes 12 extend by lifting or lowering the work ropes 14.

With the processing above, the logging device 64 can move in a substantially horizontal direction within a substantially horizontal plane in the area surrounded by the four support posts 10, log trees in the area, and grip and convey the logged timber.

Further, the first lifting device 18a fixes the first work rope 14a, the second lifting device 18b lifts the second work rope 14b, the third lifting device 18c fixes the third work rope 14c, and the fourth lifting device 18d lifts the fourth work rope 14d so as to raise the suspension device 36 in a vertical direction.

Further, the first lifting device 18a fixes the first work rope 14a, the second lifting device 18b lowers the second work rope 14b, the third lifting device 18c fixes the third work rope 14c, and the fourth lifting device 18d lowers the fourth work rope 14d to move down the suspension device 36 in the vertical direction. With the processing above, the suspension device 36 and the logging device 64 can be roughly moved up and down. The suspension device 36 described above moves the elevating wire up and down to move the logging device 64 up and down with higher accuracy.

When the logging device 64 logs a tree, the lifting devices 18 fixes the work ropes 14 such that the suspension device 36 does not move.

As described above, the lifting device 18 is provided for each of the four support posts 10. Therefore, the moving devices 16 and the suspension device 36 can be moved using the four work ropes 14. Accordingly, the overhead line system 1 can have a simple configuration, and this eliminates the need for using work ropes in an endless loop shape. Therefore, there is no need for stretching a plurality of the endless-loop work ropes in the forest, and it is sufficient to stretch the four work ropes 14 not having an endless loop shape, thereby alleviating a work load to install and remove the overhead line system 1.

Here, in the overhead line system 1, for example, when one of the lifting devices 18 fails, the cooperative control cannot be executed. The other lifting devices 18 lift the work ropes 14 and the tension of the work ropes 14 increases, which results in an increase in the tension of the main ropes 12.

Further, even when the logging device 64 in the process of moving or the timber gripped by the logging device 64 in the process of moving are caught on a branch of the tree, etc., the lifting devices 18 continue to lift the work ropes 14 and the tension of the work ropes 14 increases, which results in an increase in the tension of the main ropes 12.

In such a situation, the overhead line system 1 may break down, for example, the work rope 14 or the main rope 12 is broken, the support post 10 is tilted or overturned, or the lifting device 18 breaks down. On the basis of the above, the control device 30 controls the lifting devices 18 and the fixing devices 20 so as to reduce the tension when a predetermined condition regarding a tension abnormality of the overhead line is satisfied. The predetermined condition includes, for example, a condition that the tension detected by the tension detecting unit 26 is equal to or higher than a first threshold. Specifically, when the predetermined condition is satisfied, the control device 30 causes the lifting devices 18 to lower the work ropes 14 and causes the fixing devices 20 to lower the main ropes 12 until the tension detected by the tension detecting unit 26 reaches or falls below a second threshold that is lower than the first threshold to sag the work ropes 14 and the main ropes 12 such that the moving devices 16, the suspension device 36, and the logging device 64 are moved down to the ground.

The first threshold and the second threshold can be determined experimentally. When the moving devices 16, the suspension device 36, and the logging device 64 reach the ground, the tensions of the main ropes 12 and the work ropes 14 become significantly smaller than the first threshold. The tension when the moving devices 16, the suspension device 36, and the logging device 64 reach the ground may be set as the second threshold.

The predetermined condition may be a condition that, for example, the operator presses an emergency stop button of the control device 30, or a condition that an image in which the logging device 64 has not moved due to the timber being caught on the trees is captured by a camera of the suspension device 36.

As described above, when the predetermined condition is satisfied, the tensions of the work ropes 14 and the main ropes 12 can be reduced. The configuration above can suppress the overhead line system 1 from being broken due to the tension abnormality of the overhead line, and can protect the overhead line system 1 when an abnormality occurs.

Further, when the tension abnormality occurs, the moving devices 16, the suspension device 36, and the logging device 64 can be moved down to the ground. With the processing above, the tension of the overhead line is sufficiently small. Therefore, when any of the lifting devices 18 fails, it is easy to repair or replace the failed lifting device 18. When the logging device 64, etc. is caught on a branch of the tree, etc., it becomes easier to release the logging device 64 from a state of being caught.

Figure 2:
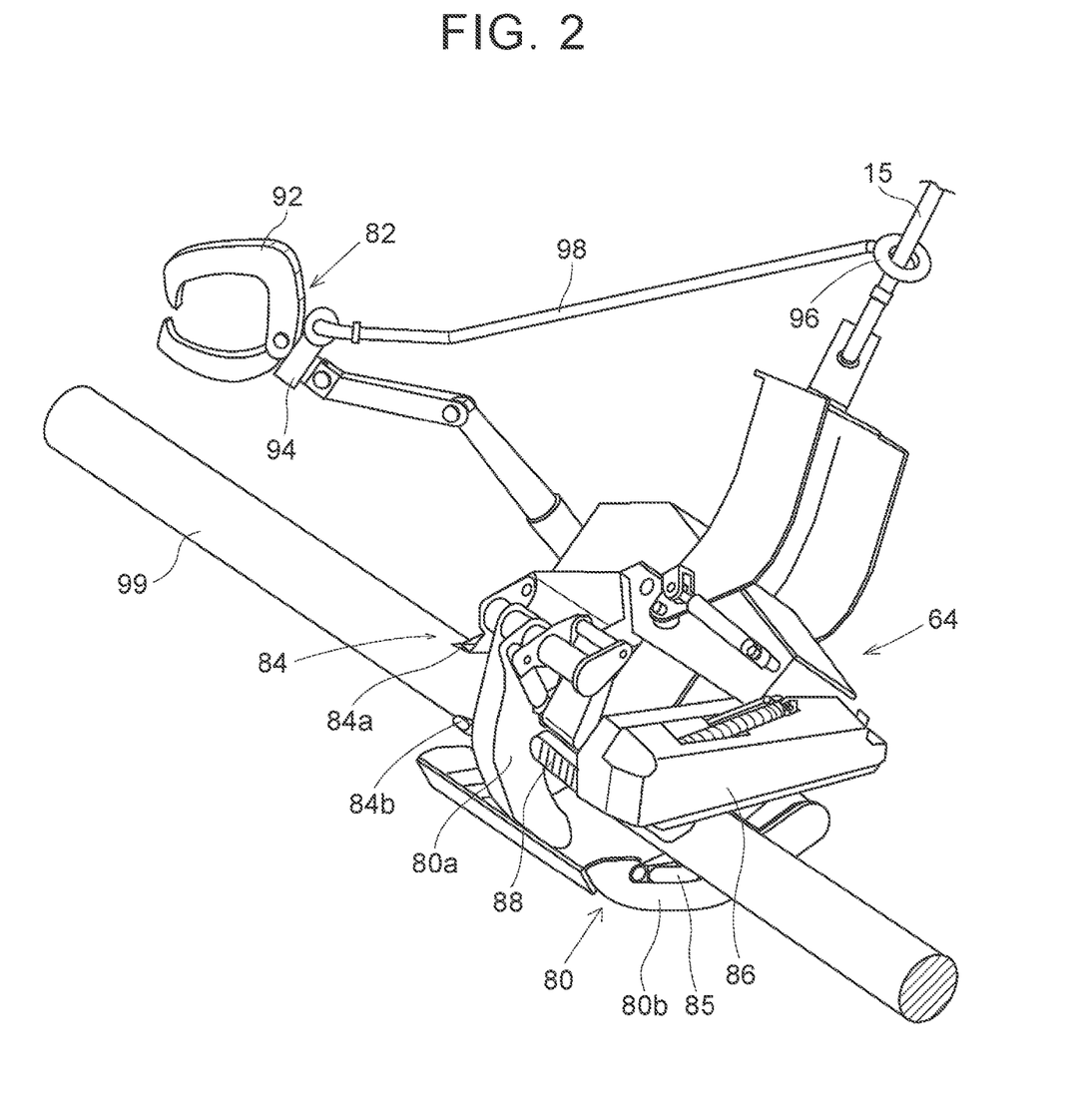
FIG. 2 is a perspective view of a logging device in a state where a tree is gripped.
Figure 3:
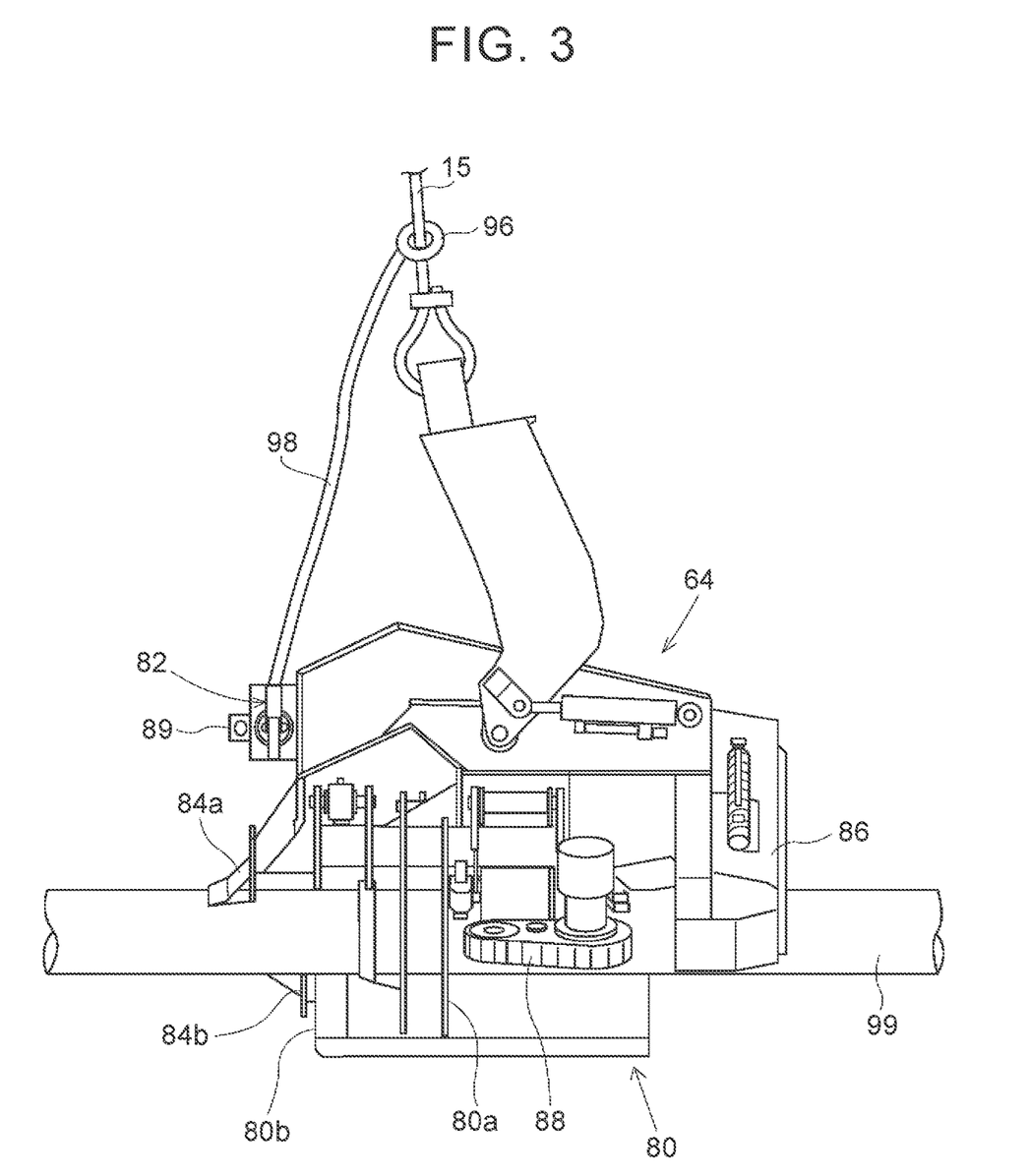
FIG. 3 is a front view of the logging device in the state where the tree is gripped.

Next, an example of a configuration of the logging device 64 will be described. FIG. 2 is a perspective view of the logging device 64 in a state where a tree 99 is gripped. FIG. 3 is a front view of the logging device 64 in the state where the tree 99 is gripped. The logging device 64 is attached in a suspended state from the suspension device 36 shown in FIG. 1, and can receive the command signal wirelessly. The logging device 64 is suspended from the suspension device 36 using an elevating wire 15, and moves up and down as the suspension device 36 lifts and lowers the elevating wire 15. The logging device 64 includes a grip portion 80, a manipulator 82, a pruning portion 84, a cutting portion 86, a sending portion 88, and a camera 89.

The grip portion 80 can grip a tree and includes a pair of gripping bodies 80a, 80b. The gripping bodies 80a, 80b have a substantially arc shape when viewed in a side view along a longitudinal direction of the tree 99, and are provided so as to be rotatable. The gripping bodies 80a, 80b grip the tree 99 in such a manner that tip ends thereof rotate so as to be close to each other, and releases the grip in such a manner that the tip ends rotate so as to be distant away from each other. The gripping bodies 80a, 80b include a roller 85 in a portion in contact with the tree 99, that is, on an inner peripheral side of the gripping bodies 80a, 80b when viewed in the side view. The roller 85 has a rotation axis extending in a direction orthogonal to the longitudinal direction of the tree 99, rotates when the tree 99 moves in the longitudinal direction, and allows movement of the tree 99 in the longitudinal direction in the state where the grip portion 80 grips the tree 99. The grip portion 80 may be able to grip the tree 99 with two stages of force, that is, a weak gripped state and a strong gripped state. The roller 85 may be rotatable in the weak gripped state and is not rotatable in the strong gripped state.

The sending portion 88 is provided for each of the gripping bodies 80a, 80b, and is rotationally driven in a similar manner to a belt conveyor. The sending portion 88 is pressed against the tree surface in the weak gripped state of the tree 99. When the sending portion 88 is driven, the tree is sent out in the longitudinal direction. The sending portion 88 can move the logging device 64 gripping the tree 99 along the tree 99. The sending portion 88 may have a stopper, and may be configured so as not to rotate when the tree 99 is gripped and conveyed.

The pruning portion 84 includes a plurality of cutters 84a, 84b provided for the gripping bodies 80a, 80b, respectively, and can prune branches of the tree 99. In the state where the tree 99 is gripped, the cutters 84a, 84b are positioned so as to surround the tree 99, are pressed against the surface of the tree, and cut to scrape off the bark and branches as the sending portion 88 is driven and the logging device 64 is moved along the tree 99.

The cutting portion 86 is provided on a side surface of the gripping body 80a, and cuts the tree 99 in the state where the tree 99 is gripped. The cutting portion 86 functions as a chainsaw, and cuts the tree 99 as a blade portion rotates toward the tree 99. The cutting portion 86 is located below the logging device 64 in the state where the tree 99 is gripped.

The manipulator 82 has a function of gripping the tree 99 and bringing the logging device 64 closer to the tree 99, and a function of supporting the elevating wire 15 above the tree 99. The manipulator 82 includes an arm portion 90, a hook portion 92, a detachable portion 94, a ring portion 96, and a connecting wire 98.

The arm portion 90 is driven in a manner similar to a robot arm and extends to bring the hook portion 92 closer to the tree 99. The hook portion 92 is pivotable so as to open, and can move in a manner similar to a human hand to grip the tree 99.

The detachable portion 94 is attachable to and detachable from the arm portion 90, and is detached from the arm portion 90 in response to a control signal to separate the hook portion 92 from the arm portion 90. The elevating wire 15 is inserted through the ring portion 96. The ring portion 96 is movable along the elevating wire 15 in a state where the ring portion 96 is connected to the elevating wire 15. The connecting wire 98 connects the hook portion 92 to the elevating wire 15 via the ring portion 96.

Figure 4A:
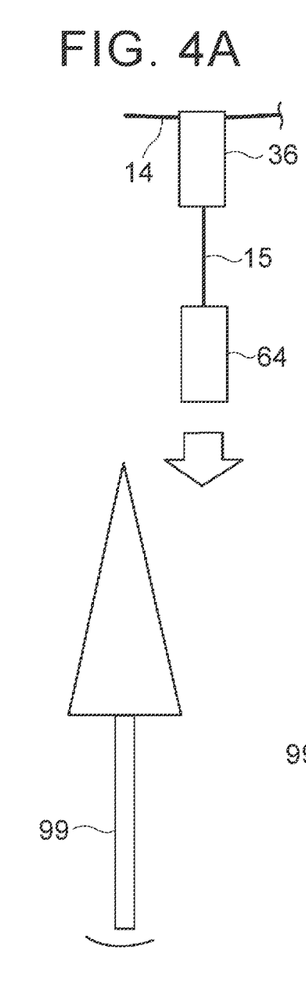
FIG. 4A is a diagram showing a flow for causing the logging device to grip the tree.

FIG. 4A to FIG. 4D show a flow in which the logging device 64 grips the tree. As shown in FIG. 4A, the suspension device 36 and the logging device 64 are moved to a position above the tree 99 to be logged as the work ropes 14 are wound by the lifting devices 18. The logging device 64 is suspended from the suspension device 36 using the elevating wire 15.

Figures 4B, 4C:
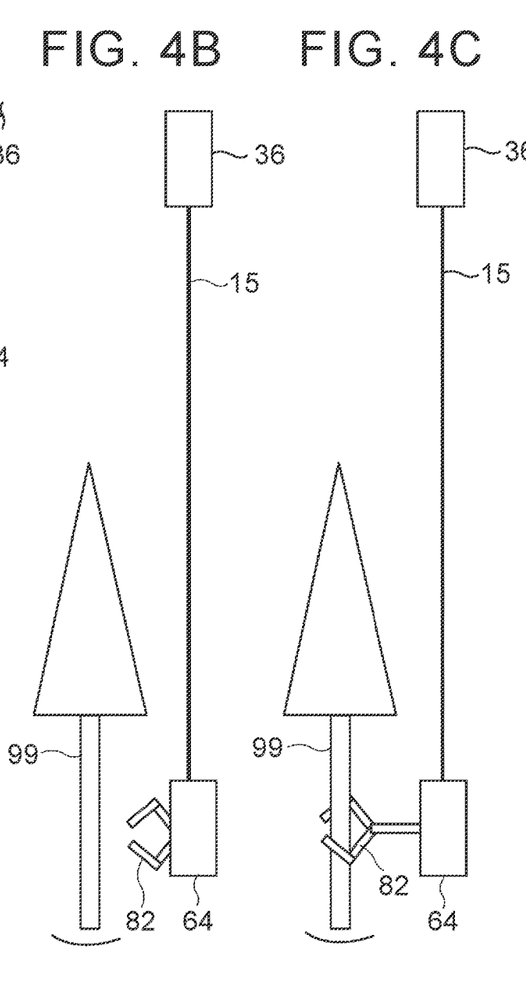
FIG. 4B is a diagram showing a flow for causing the logging device to grip the tree.
FIG. 4C is a diagram showing a flow for causing the logging device to grip the tree.

In FIG. 4B, the suspension device 36 lowers the elevating wire 15 to move the logging device 64 downward to the vicinity of a root of the tree 99. With the processing above, the logging device 64 is located in a branchless portion of the tree 99. The manipulator 82 extends the arm portion 90 and causes the arm portion 90 to grip a trunk of the tree 99 as shown in FIG. 4C. During this processing, the arm portion 90 may be operated while confirming the position of the trunk using the camera 89.

Figure 4D:
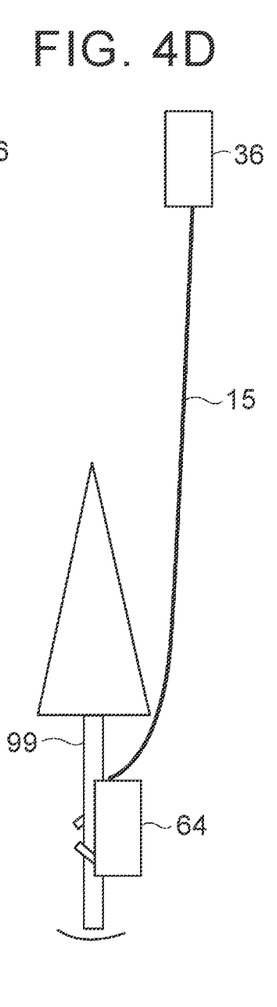
FIG. 4D is a diagram showing a flow for causing the logging device to grip the tree.

After the hook portion 92 of the manipulator 82 grips the tree 99, as shown in FIG. 4D, the arm portion 90 is contracted to bring the logging device 64 closer to the trunk of the tree 99, and the grip portion 80 of the logging device 64 grips the tree 99. The logging device 64 is in an unstable state because the logging device 64 is suspended from the suspension device 36. However, the logging device 64 can easily grip the tree 99 as the manipulator 82 brings the logging device 64 closer to the tree 99.

Figure 5A:
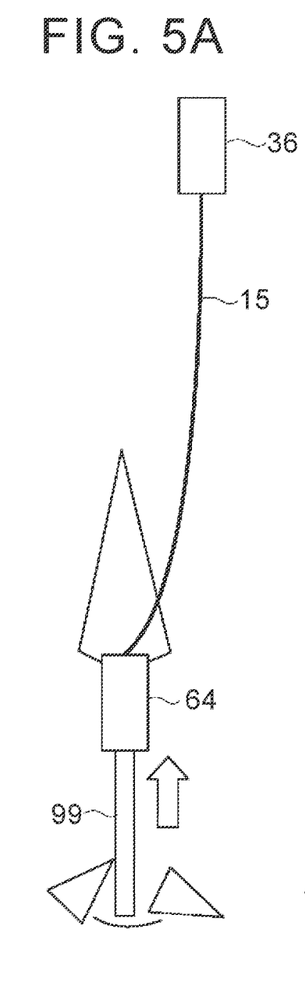
FIG. 5A is a diagram showing a flow of pruning and logging performed by the logging device.
Figure 5B:
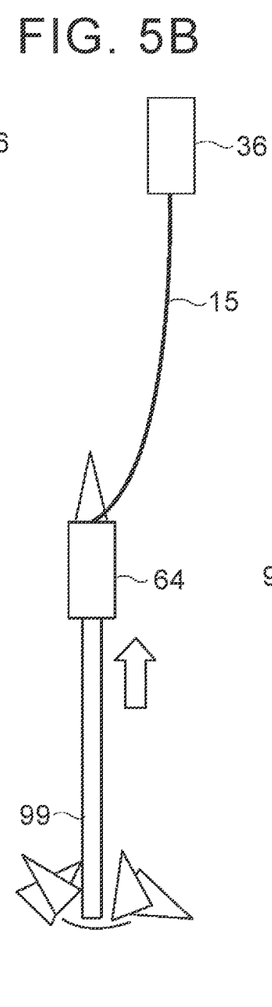
FIG. 5B is a diagram showing a flow of pruning and logging performed by the logging device.

FIG. 5A to FIG. 5E show a flow of pruning and logging performed by the logging device 64. After the grip portion 80 of the logging device 64 grips the trunk of the tree 99, as shown in FIG. 5A, the grip portion 80 is placed in the weak gripped state and the sending portion 88 is driven such that the logging device 64 moves upward along the tree 99 and prunes the branches. In FIG. 5B, the logging device 64 is moved to an upper portion of the tree 99 and completes the pruning.

Figure 5C:
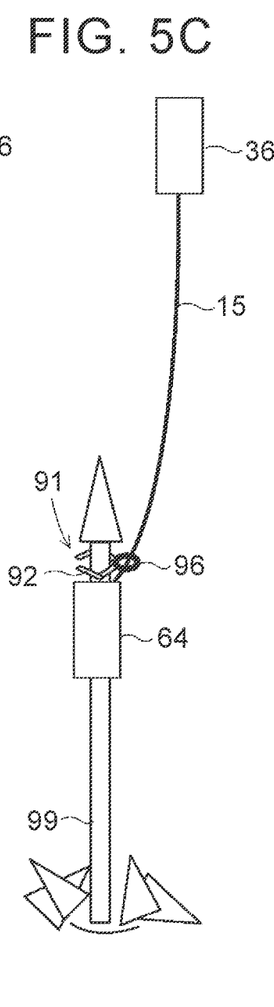
FIG. 5C is a diagram showing a flow of pruning and logging performed by the logging device.

As shown in FIG. 5C, the hook portion 92 of the manipulator 82 grips the upper portion of the tree 99. The detachable portion 94 is detached from the arm portion 90. The hook portion 92 is fixed to the upper portion of the tree 99 in a state where the hook portion 92 is connected to the elevating wire 15 via the ring portion 96. The hook portion 92 and the ring portion 96 function as a fixing member 91 through which the elevating wire 15 is inserted and that is fixed to the upper portion of the tree 99. The fixing member 91 is fixed to the upper portion of the tree 99 when the logging device 64 is moved to the upper portion of the tree 99 using the sending portion 88.

Figure 5D:
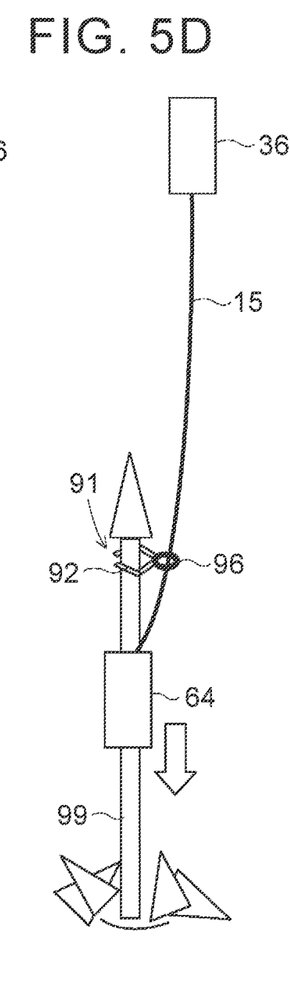
FIG. 5D is a diagram showing a flow of pruning and logging performed by the logging device.
Figure 5E:
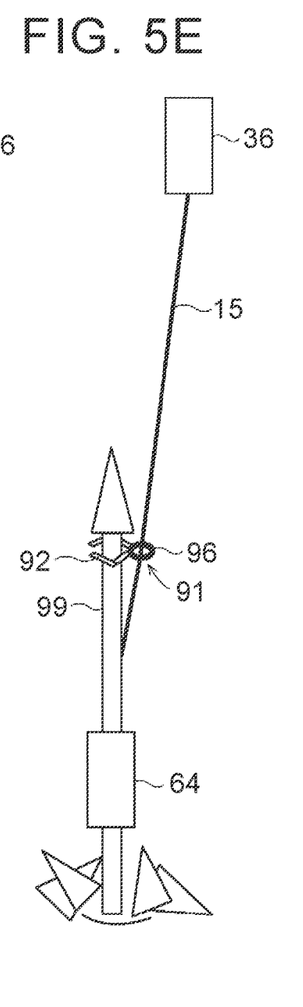
FIG. 5E is a diagram showing a flow of pruning and logging performed by the logging device.

In FIG. 5D, the logging device 64 is moved downward as the sending portion 88 is driven. In FIG. 5E, the logging device 64 is located in a lower portion of the tree 99. The grip portion 80 is placed in the strong gripped state. The cutting portion 86 is then driven to cut the tree 99. During this processing, the tree 99 is supported at two points by the fixing member 91 and the logging device 64.

Figures 6A, 6B:
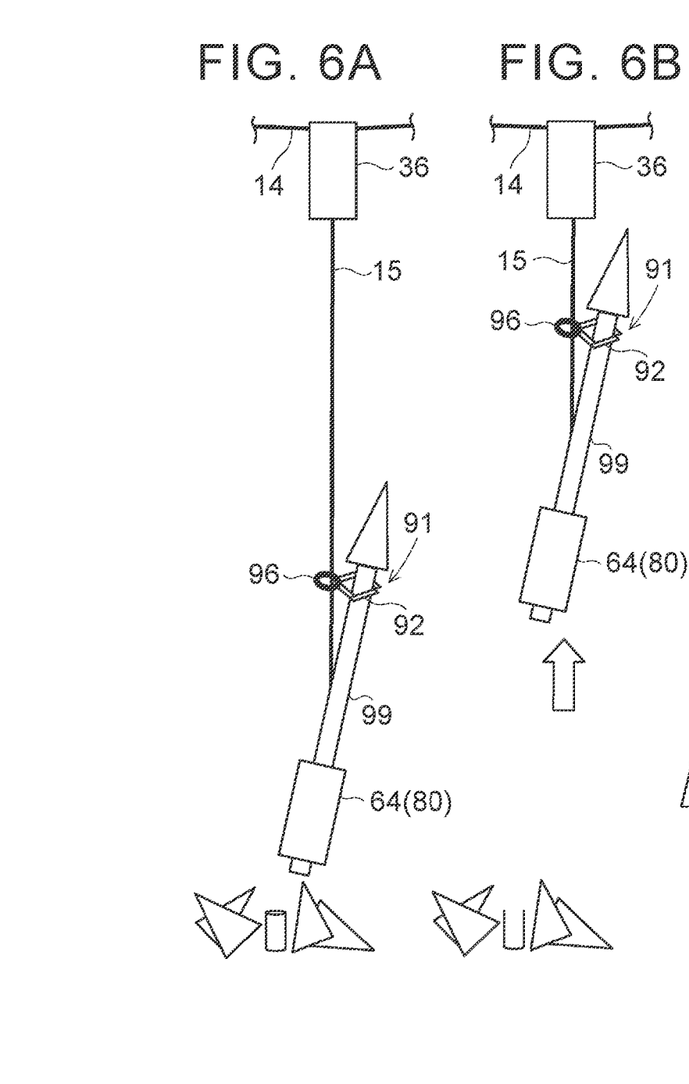
FIG. 6A is a diagram showing a flow of conveying the tree in the state where the logging device grips the tree.
FIG. 6B is a diagram showing a flow of conveying the tree in the state where the logging device grips the tree.

FIG. 6A to FIG. 6D show a flow of conveying the tree 99 in the state where the logging device 64 grips the tree 99. FIG. 6A shows a state where the tree 99 is supported at two points by the fixing member 91 and the grip portion 80, and therefore the tree 99 does not fall down even after the tree 99 is cut. When felling the tree 99, it is necessary to fell the tree 99 in a direction preset in accordance with a positional relationship with adjacent trees. However, the fixing member 91 and the grip portion 80 support the tree 99 such that the need for felling the tree 99 can be eliminated. With the configuration above, there is no need for determining the felling direction. Therefore, there is also no need for determining a direction in which the grip portion 80 grips the tree 99. In addition, a load applied to the work ropes 14 can be significantly reduced as compared with the case of felling. Further, it is possible to suppress a damage on the tree 99 caused as the tree 99 collides with other trees. Further, there is no need to preliminary log other trees located in the felling direction.

Figure 6C:
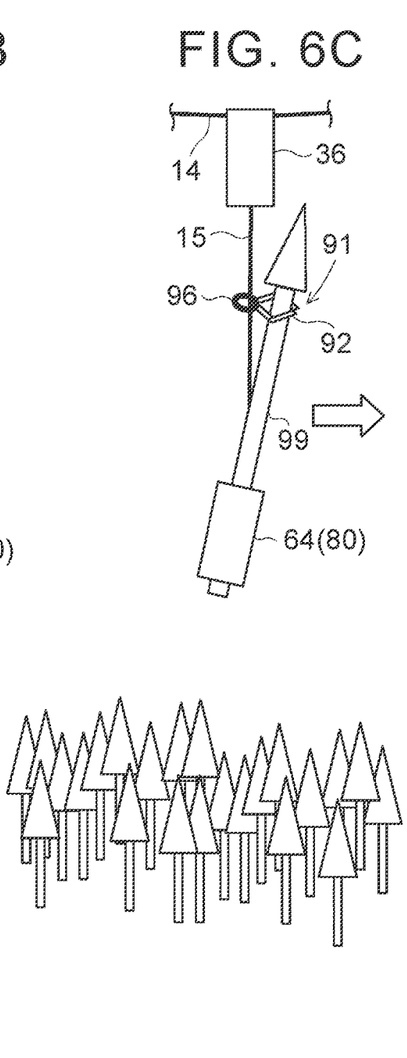
FIG. 6C is a diagram showing a flow of conveying the tree in the state where the logging device grips the tree.

FIG. 6B shows a state where the suspension device 36 lifts the elevating wire 15 and lifts the tree 99 gripped by the grip portion 80 up in the air. FIG. 6C shows a state where the work rope 14 is wound by the lifting device 18 to convey the cut tree 99 above the forest.

Figure 6D:
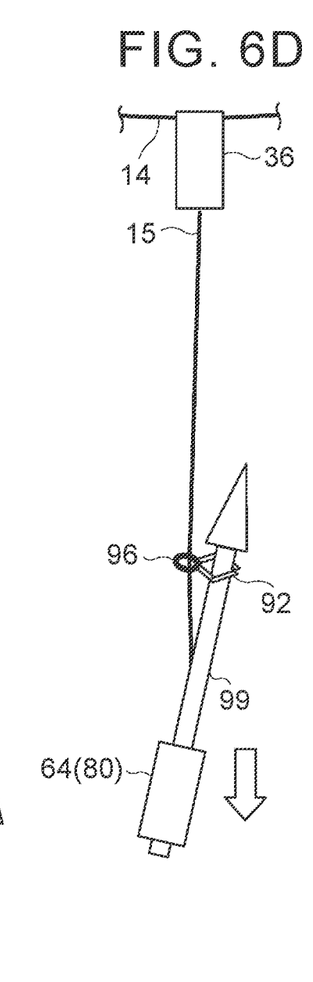
FIG. 6D is a diagram showing a flow of conveying the tree in the state where the logging device grips the tree.

In FIG. 6D, when the tree 99 is conveyed to a predetermined point, the suspension device 36 lowers the elevating wire 15 and moves the tree 99 downward together with the grip portion 80. When the grip portion 80 releases the grip and the fixing member 91 is detached, conveyance of the tree 99 is completed. As shown in FIG. 4A to FIG. 6D, even when the operator does not go to the position of the tree 99, the tree 99 can be logged and conveyed, which results in suppressing a work load imposed on the operator.

Figure 7:
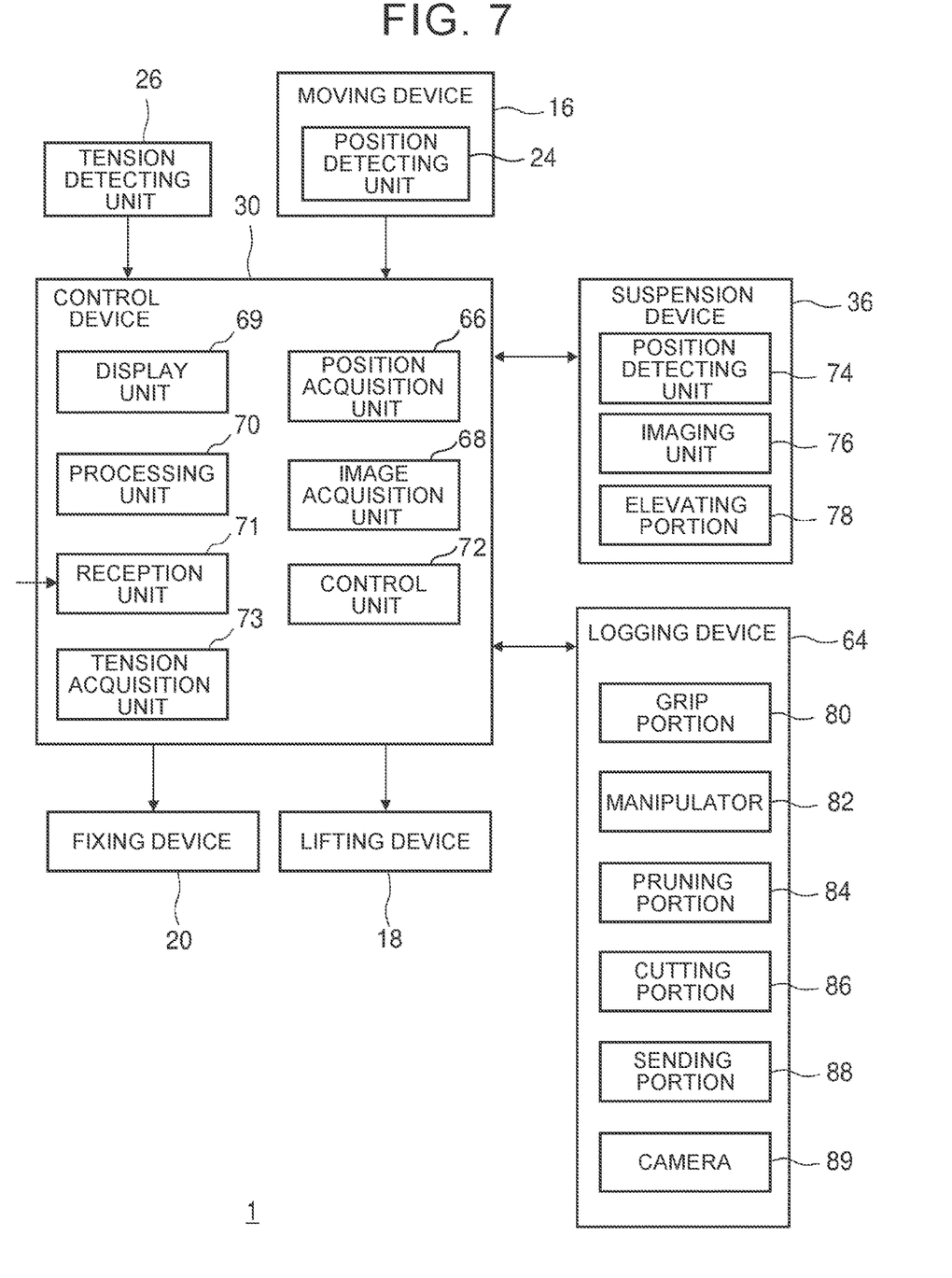
FIG. 7 is a diagram showing a functional configuration of the overhead line system.

FIG. 7 shows a functional configuration of the overhead line system 1 shown in FIG. 1. The control device 30 is provided in a control room and remotely controls the lifting devices 18, the fixing devices 20, the suspension device 36, and the logging device 64. The moving device 16 includes a position detecting unit 24. The suspension device 36 includes a position detecting unit 74, an imaging unit 76, and an elevating portion 78. The control device 30 includes a position acquisition unit 66, an image acquisition unit 68, a display unit 69, a processing unit 70, a reception unit 71, a control unit 72, and a tension acquisition unit 73. The control device 30 is wirelessly connected to the moving devices 16, the lifting devices 18, the fixing devices 20, the suspension device 36, the logging device 64, and the tension detecting unit 26.

The position detecting unit 24 of the moving device 16 acquires the position information of each of the first moving device 16a and the second moving device 16b using the global positioning system (GPS), and transmits the acquired position information to the position acquisition unit 66. The position detecting unit 74 of the suspension device 36 acquires the position information of the suspension device 36 using the GPS, and transmits the acquired position information to the position acquisition unit 66. The imaging unit 76 captures an image of a lower portion of the suspension device 36 and images of the tree 99 and the logging device 64, and transmits the captured images to the image acquisition unit 68. The elevating portion 78 lifts and lowers the elevating wire 15 to move the logging device 64 up and down.

The position acquisition unit 66 of the control device 30 acquires position information of the moving devices 16 and position information of the suspension device 36, and transmits the position information to the processing unit 70. The image acquisition unit 68 acquires the captured images by the imaging unit 76 and transmits the captured images to the processing unit 70. Further, the image acquisition unit 68 acquires a captured image from the camera 89 of the logging device 64 and transmits the captured image to the processing unit 70. The tension acquisition unit 73 acquires tension data from the tension detecting unit 26 and transmits the data to the processing unit 70.

The reception unit 71 accepts an input by the operator. For example, the operator operates the arm portion 90 of the manipulator 82 and the hook portion 92 to grip the tree. Further, the operator can adjust the position of the logging device 64 by operating the lifting devices 18 and the suspension device 36. The operator can also input an operation of the emergency stop button when the tension abnormality occurs with the overhead line.

The processing unit 70 transmits the image captured by the imaging unit 76 and the image captured by the camera 89 to the display unit 69 and causes the display unit 69 to display the images. The operator can operate the logging device 64 and the lifting devices 18 and also determine whether the tension of the overhead line is abnormal based on the image transmitted from the suspension device 36 and the image transmitted from the logging device 64 when the display unit 69 displays the images.

The processing unit 70 makes a determination to proceed with each of the operation processes shown in FIG. 4A to FIG. 6D based on the position information of the moving devices 16, the position information of the suspension device 36, the image captured by the imaging unit 76, and the image captured by the camera 89 of the logging device 64, etc. The control unit 72 controls the lifting devices 18, the suspension device 36, and the logging device 64 to execute the operation processes determined by the processing unit 70.

The processing unit 70 determines execution of the operation process to move the suspension device 36 and the logging device 64 to the position above the tree 99 to be logged based on the position information of the moving devices 16, the position information of the suspension device 36, and the image captured by the imaging unit 76.

The processing unit 70 acquires the position information of the preset tree 99 and determines to move the suspension device 36. The control unit 72 drives the lifting devices 18 to move the suspension device 36 and the logging device 64. The positions of the first moving device 16a and the second moving device 16b can be controlled using the position information of the moving devices 16 as well. This makes it possible for the suspension device 36 and the logging device 64 to smoothly move.

The processing unit 70 determines whether the predetermined condition is satisfied based on the tension data of the overhead line, etc. The processing unit 70 may detect that the logging device 64 does not move because the logging device 64 is caught on the trees, etc., by executing image recognition of the image captured by the imaging unit 76 and the image captured by the camera 89 of the logging device 64. When the processing unit 70 determines that the predetermined condition is satisfied, the control unit 72 controls the lifting devices 18 and the fixing devices 20 so as to reduce the tension as described above. The control unit 72 causes the fixing devices 20 to lower the main ropes 12 by causing the fixing portions 22 of the fixing devices 20 to release the fixing of the drums 21.

The overhead line system 1 includes processing to be automatically executed by the control device 30 and processing to be executed through the operation by the operator. For example, the operator may perform an operation to cause the grip portion 80 to grip the tree 99 shown in FIG. 4B to FIG. 4D, and the control device 30 may automatically execute other operations.

When the grip portion 80 grips the tree 99, the processing unit 70 determines execution of the pruning process shown in FIG. 5A and FIG. 5B. The control unit 72 drives the sending portion 88 to move the logging device 64 upward.

Next, the processing unit 70 determines execution of the operation process of fixing the hook portion 92 to the upper portion of the tree 99 using the manipulator 82 shown in FIG. 5C. The control unit 72 drives the arm portion 90 and the hook portion 92 to grip the upper portion of the tree 99 and causes the detachable portion 94 to be detached from the arm portion 90. With the processing above, the fixing member 91 through which the elevating wire 15 is inserted is fixed to the upper portion of the tree 99. Note that, the operator may operate the process above.

Next, the processing unit 70 determines execution of the operation process of cutting the lower portion of the tree 99 shown in FIG. 5D and FIG. 5E. The control unit 72 drives the sending portion 88 to move the logging device 64 to the lower portion of the tree 99, and drives the cutting portion 86 to cut the lower portion of the tree 99.

Next, the processing unit 70 determines execution of the operation process of conveying the tree 99 shown in FIG. 6A to FIG. 6D. The control unit 72 drives the elevating portion 78 to lift the logging device 64 and the tree 99 above the forest, and drives the lifting devices 18 to convey the tree 99 to a predetermined position. The control unit 72 then drives the elevating portion 78 to move the tree 99 down and drives the grip portion 80 to release the grip.

As described above, the overhead line system 1 can log and convey the tree 99, which alleviates the work load imposed on the operator to move to the position of the tree 99. Further, with the overhead line system 1, the tree 99 is supported at two positions by the fixing member 91 and the logging device 64 when cutting the tree 99, which can eliminate the need for felling the tree 99.

The mode in which the overhead line system 1 is used for logging and collecting the logged trees has been described above. However, the disclosure is not limited to the mode above, and the disclosure can be applied in various modes by replacing the logging device 64 of the overhead line system 1 with another device. For example, providing a holding device for holding the tree instead of the logging device 64 makes it possible to collect the logged trees. Further, providing a detecting device instead of the logging device 64 makes it possible to acquire data on the trees. Yet further, providing a sound wave generator instead of the logging device 64 makes it possible to drive away vermin.

Tree Detection System

A detection system using the overhead line system 1 detects trees so as to generate tree information in the forest. The tree information is used for selection of trees for thinning and resource management. In the detection system, a detecting device that detects trees is installed instead of the logging device 64.

The detecting device moves in an area defined by the support posts 10 together with the suspension device 36, and irradiates a laser light to or captures images of the trees in the area to acquire the detection data. The trees included in the detection data are subjected to analysis processing and the tree information is generated and recorded based on the analysis processing.

The tree information includes a tree identification (ID), position information, diameter information, tree height, and bending information. The position information is acquired based on the detected position by the detecting device and the positional relationship between the detecting device and the tree. The diameter information indicates a diameter of the tree from the root to the vicinity of a treetop in a stepwise manner, and tapering of the tree can be identified based on the diameter information. The bending information indicates a degree of bending of the tree.

The positional relationship between the trees is identified based on the position information of the tree information, and a volume of the tree is identified based on the diameter information and the tree height. The positional relationship between the trees is used to select trees for thinning. The volume and the bending information of the tree is used to calculate what kind of timber can be obtained from the target tree, and can be used for resource management and selection of trees for logging. With the tree information on the forest, it is possible to identify the timber that can be produced from the forest, which makes it possible to easily select the tree for logging when an order for timber is placed.

With the data obtained by detecting the tree from above, the trunk of the tree cannot be detected due to branches and leaves interfering with the detection. Therefore, the diameter information and the bending information cannot be derived. Therefore, the detecting device is moved down through the trees and performs detection on the root side of the tree.

Vermin Control System

The overhead line system 1 can be used as a vermin control system that protects trees from vermin. In the vermin control system, a sound wave generator that drives away the vermin is installed instead of the logging device 64. The sound wave generator includes a speaker that generates ultrasonic waves, a buzzer that generates an alarm, and a camera. When the control device 30 analyzes the image captured by the camera and detects the vermin, the sound wave generator is moved closer to the vermin and the speaker and the buzzer are driven to drive away the vermin.

As described above, the overhead line system 1 can execute a plurality of functions in addition to logging and collecting the trees by replacing the device to be suspended by the suspension device 36. With the configuration above, a convenience of the overhead line system 1 can be improved, and the support posts 10 and the overhead lines can be effectively used. A mounting portion for replacing the device is provided at an lower end of the elevating wire 15. With this configuration, the device can be attached to and detached from the mounting portion.

The disclosure has been described above based on the embodiment. The embodiment is merely an example, and it is understood by those skilled in the art that various modifications are possible for each component and combination of the processing processes, and that such modifications are also within the scope of the disclosure.

In the embodiment, the mode in which the elevating portion 78 is provided for the suspension device 36. However, the disclosure is not limited to this, and the logging device 64 may be provided with the elevating portion 78. In this case, one end of the elevating wire 15 may be fixed to the suspension device 36 and the other end may be fixed to the elevating portion 78, or the elevating wire 15 may be stretched from the fixed end of the logging device 64 and fixed to the elevating portion 78 via the pulley of the suspension device 36.

The suspension device 36 may include a regenerative power generation portion that converts a rotational energy of the first pulleys 37 and the second pulleys 38 into an electrical energy while the suspension device 36 is moving down. The generated electric power may be stored in a power storage device (not shown) of the suspension device 36, and can be used as the electric power used for wireless communication, etc.

In the embodiment, the overhead line system 1 including the four support posts 10 is shown. However, the disclosure is not limited to this. For example, the support posts 10 may be two or three. Further, although the H-type overhead line system 1 is shown in the embodiment, the disclosure is not limited to the H-type.

In the embodiment, the overhead line system 1 in which the lifting devices 18 are separately disposed for the respective support posts 10. However, the lifting devices 18 may be collectively disposed at one location in proximity to the collecting place 100. In this case, six of the work ropes 14 are used. The first work rope 14a is stretched from the lifting device 18 and fixed to the first moving device 16a via the first support post 10a. The second work rope 14b is stretched from the lifting device 18 and fixed to the first moving device 16a via the first support post 10a and the second support post 10b. The third work rope 14c is stretched from the lifting device 18 and fixed to the second moving device 16b via the fourth support post 10d and the third support post 10c. The fourth work rope 14d is stretched from the lifting device 18 and fixed to the second moving device 16b via the fourth support post 10d. The first work rope 14a to the fourth work rope 14d move the moving devices 16. A fifth work rope is connected to the first moving device 16a and the suspension device 36. A sixth work rope is connected to the second moving device 16b and the suspension device 36. The moving devices 16 each has a function of lifting and lowering the fifth work rope and the sixth work rope in response to a wireless command signal. With the configuration above, the suspension device 36 moves between the first moving device 16a and the second moving device 16b. That is, the moving devices 16 also function as the lifting device. The fifth work rope and the sixth work rope may be extended up to the positions of the lifting devices 18 so as to integrate the lifting function of the moving devices 16 into the lifting function of the lifting device 18. Even in the modification above, the overhead line system 1 can be protected when an abnormality occurs.

What is claimed is:

1. An overhead line system, comprising:
   a plurality of support posts;

an overhead line supported by the support posts;

a winch that lifts the overhead line;

a suspension device including a plurality of pulleys, the overhead line being hung on the pulley and the suspension device being movable in the air as the winch winds the overhead line;

another overhead line supported by the support posts;

a fixing device having a drum and a fixing portion, the fixing portion being fittable to the drum and able to stop rotation of the drum, the other overhead line being fixed to the drum and the fixing device being able to stop lifting or lowering the other overhead line;

a moving device that is connected to the overhead line and is movable in the air along the other overhead line as the winch winds the overhead line, the suspension device being connected to the moving device via the overhead line;

a tension sensor that detects tension of the overhead line and the other overhead line; and a control device having a wireless transmitter, the control device that controls the winch and the fixing device, by sending wireless command signals from the wireless transmitter to the winch and the fixing device, so as to reduce tension of the overhead line when a predetermined condition relating to a tension abnormality of the overhead line is satisfied, and wherein:

the predetermined condition includes a condition that the tension detected by the tension sensor is equal to or higher than a first threshold, and when the predetermined condition is satisfied, the control device causes the winch to lower the overhead line, and causes the fixing device to lower the other overhead line until the tension detected by the tension sensor becomes equal to or lower than a second threshold that is lower than the first threshold, such that the moving device and the suspension device are moved down.

2. A control method for an overhead line system including; a winch that lifts an overhead line and another overhead line supported by a support post, a suspension device having a plurality of pulleys on which the overhead line being hung and the suspension device being movable in the air as the winch winds the overhead line, a fixing device having a drum and a fixing portion fiittable to the drum and able to stop rotation of the drum, the other overhead line being fixed to the drum and the fixing device being able to stop lifting or lowering the other overhead line, a moving device that is connected to the overhead line and is movable in the air along the other overhead line as the winch winds the overhead line, the suspension device being connected to the moving device via the overhead line, a tension sensor that detects tension of the overhead line and the other overhead line, and a control device having a wireless transmitter, the method comprising, when a predetermined condition is satisfied:

sending wireless command signals from the wireless transmitter to the winch and the fixing device;

controlling, by the control device, the winch to reduce tension of the overhead line;

controlling, by the control device, the winch to lower the overhead line; and controlling, by the control device, the fixing device to lower the other overhead line until the tension detected by the tension sensor becomes equal to or lower than a second threshold, such that the moving device and the suspension device are moved down, wherein the predetermined condition relates to a tension abnormality of the overhead line, the predetermined condition includes a condition that the tension detected by the tension sensor is equal to or higher than a first threshold, and the second threshold is lower than the first threshold.

* * * * *